US012596736B2

(12) United States Patent
Murthy et al.

(10) Patent No.: US 12,596,736 B2
(45) Date of Patent: *Apr. 7, 2026

(54) SYSTEMS AND METHODS FOR USING PROMPT DISSECTION FOR LARGE LANGUAGE MODELS

(71) Applicant: Instabase, Inc., Dover, DE (US)

(72) Inventors: Vineeth Chinmaya Murthy, Bengaluru (IN); Rafal Powalski, Warsaw (PL)

(73) Assignee: Instabase, Inc., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/962,656

(22) Filed: Nov. 27, 2024

(65) Prior Publication Data

US 2025/0086216 A1 Mar. 13, 2025

Related U.S. Application Data

(63) Continuation of application No. 18/358,780, filed on Jul. 25, 2023, now Pat. No. 12,216,694.

(51) Int. Cl.
*G06F 16/33* (2025.01)
*G06F 16/334* (2025.01)
*G06F 40/30* (2020.01)
(52) U.S. Cl.
CPC .......... *G06F 16/3347* (2019.01); *G06F 40/30* (2020.01)
(58) Field of Classification Search
CPC ........ G06F 16/13; G06F 16/24; G06F 16/156; G06F 3/1297; G06N 3/00; G06N 5/00;
(Continued)

(56) References Cited

U.S. PATENT DOCUMENTS

| | | | |
|---|---|---|---|
| 7,620,976 B2 | 11/2009 | Low | |
| 8,881,307 B2 | 11/2014 | Nun | |
| (Continued) | | | |

FOREIGN PATENT DOCUMENTS

| | | |
|---|---|---|
| CN | 117951274 A | 4/2024 |
| CN | 118332072 A | 7/2024 |
| (Continued) | | |

OTHER PUBLICATIONS

Li, M., Zhao, Y., Yu, B., Song, F., Li, H., Yu, H., & Li, Y. (2023). Api-bank: A comprehensive benchmark for tool-augmented llms. arXiv preprint arXiv:2304.08244. (15 pages) (Year: 2023).
(Continued)

*Primary Examiner* — Hung D Le
(74) *Attorney, Agent, or Firm* — Esplin & Associates, PC

(57) ABSTRACT

Systems and methods for using prompt dissection to prompts one or more machine learning models for a set of one or more documents are disclosed. Exemplary implementations may: store a set of document segments from the set of one or more documents; present a user interface to obtain a compound query that includes a first subquery and a second subquery; create subquery vectors that semantically represent the subqueries; determine a subset of a set of semantic vectors based on comparisons with the subquery vectors; create a combination of the individual document segments that are associated with the subset; provide one or more prompts to the one or more machine learning models, using the combination of the individual document segments as context; present replies from the one or more machine learning models, and/or perform other steps.

18 Claims, 3 Drawing Sheets

(58) Field of Classification Search

CPC ....... G05B 13/00; H03M 7/30; H04N 9/8042; G06T 9/00

See application file for complete search history.

(56) References Cited

U.S. PATENT DOCUMENTS

| | | | |
|---|---|---|---|
| 10,242,212 | B2 | 3/2019 | Tegegne |
| 10,614,345 | B1 | 4/2020 | Tecuci |
| 10,642,832 | B1 * | 5/2020 | Neumann ............. G06F 40/166 |
| 12,182,125 | B1 | 12/2024 | Buniatyan |
| 12,405,985 | B1 | 9/2025 | Kanagovi |
| 2015/0317486 | A1 | 11/2015 | Muller |
| 2019/0340949 | A1 | 11/2019 | Meisner |
| 2020/0159848 | A1 * | 5/2020 | Yeo ........................ G06N 20/00 |
| 2020/0311349 | A1 * | 10/2020 | Balasubramanian ........................ G06N 3/0442 |
| 2021/0034621 | A1 * | 2/2021 | Patel ................... G06F 16/9032 |
| 2022/0164346 | A1 * | 5/2022 | Mitra ..................... G06N 20/10 |
| 2023/0205824 | A1 | 6/2023 | Jablokov |
| 2023/0315731 | A1 * | 10/2023 | Xu .................... G06F 16/24537 707/714 |
| 2023/0385261 | A1 * | 11/2023 | Siddiqui ............. G06F 16/2272 |
| 2024/0096125 | A1 | 3/2024 | Yebes Torres |
| 2024/0202539 | A1 * | 6/2024 | Poirier .................. G06F 16/338 |
| 2024/0221007 | A1 * | 7/2024 | Hormati ................. G06N 20/00 |
| 2024/0256965 | A1 | 8/2024 | Chung |
| 2024/0289559 | A1 | 8/2024 | Gajek |
| 2024/0296279 | A1 | 9/2024 | Gardner |
| 2024/0311407 | A1 | 9/2024 | Barron |
| 2024/0338361 | A1 | 10/2024 | Hazel |
| 2025/0045314 | A1 | 2/2025 | Madnani |
| 2025/0045445 | A1 * | 2/2025 | Srinivasan .......... G06F 21/6227 |
| 2025/0077527 | A1 | 3/2025 | Vaughn |
| 2025/0086190 | A1 | 3/2025 | Azarmi |
| 2025/0111167 | A1 | 4/2025 | McIntyre |
| 2025/0111237 | A1 | 4/2025 | Krishnamurthy |
| 2025/0117605 | A1 | 4/2025 | De Wynter |
| 2025/0148020 | A1 | 5/2025 | Padmashali |
| 2025/0165714 | A1 * | 5/2025 | Krabach ........... G06F 16/33295 |
| 2025/0272507 | A1 | 8/2025 | Shaul |
| 2025/0348741 | A1 | 11/2025 | Rimchala |
| 2025/0384206 | A1 | 12/2025 | Baird |
| 2026/0057181 | A1 | 2/2026 | Murthy |

FOREIGN PATENT DOCUMENTS

| | | |
|---|---|---|
| CN | 118656482 A | 9/2024 |
| CN | 118939782 A | 11/2024 |

OTHER PUBLICATIONS

Schick, T., Dwivedi-Yu, J., Dessì, R., Raileanu, R., Lomeli, M., Hambro, E., & Scialom, T. (2023). Toolformer: Language models can teach themselves to use tools. Advances in Neural Information Processing Systems, 36, 68539-68551. (17 pgs) (Year: 2023).

Qiao, S., Gui, H., Lv, C., Jia, Q., Chen, H., & Zhang, N. (2023). Making language models better tool learners with execution feedback. arXiv preprint arXiv:2305.13068. (10 pgs) (Year: 2023).

Paranjape, B., Lundberg, S., Singh, S., Hajishirzi, H., Zettlemoyer, L., & Ribeiro, M. T. (2023). Art: Automatic multi-step reasoning and tool-use for large language models. arXiv preprint arXiv:2303. 09014. (26 pgs) (Year: 2023).

Liu, Yilun, et al., "What Do You Want? User-Centric Prompt Generation for Text-to-image Synthesis via Multi-turn Guidance", arXiv, Cornell University repository, document No. arXiv:2408. 12910v1 [cs.AI], Aug. 23, 2024, downloaded from: https://arxiv. org/abs/ 2408.12910v1, pp. 1-15.

Zmigrod, Ran, et al., "What is the value of {templates}?" Rethinking Document Information Extraction Datasets for LLMs, arXiv, Cornell University repository, document No. arXiv:2410.15484v1 [cs.CL], Oct. 20, 2024, downloaded from: https://arxiv.org/abs/ 2410.15484, pp. 1-24.

Song, Yunpeng, et al., "VisionTasker: Mobile Task Automation Using Vision Based UI Understanding and LLM Task Planning", UIST '24, Pittsburgh, PA, Oct. 13-16, 2024, 17 pages.

Neumann, Mark, et al., "PAWLS: PDF Annotation With Labels and Structure", arXiv, Cornell University repository, document No. arXiv:2101.10281v1 [cs.CL], Jan. 25, 2021, downloaded from: https://arxiv.org/abs/2408.12910v1, pp. 1-6.

Cheng, Kanzhi, et al., "SeeClick: Harnessing GUI Grounding for Advanced Visual GUI Agents", Proc. of the 62nd Annual Meeting of the Association for Computational Linguistics, vol. I: Long Papers, Aug. 11-16, 2024, pp. 9313-9332.

Almohaimeed, Saleh, et al., "GAT-SQL: An Advanced Prompt Engineering Approach for Effective Text-to-SQL Interactions", 2024IEEE Congress on Evolutionary Computation (CEC), Yokohama, Japan, Jun. 30, 2024 Jul. 5, 2024, 10 pages.

* cited by examiner

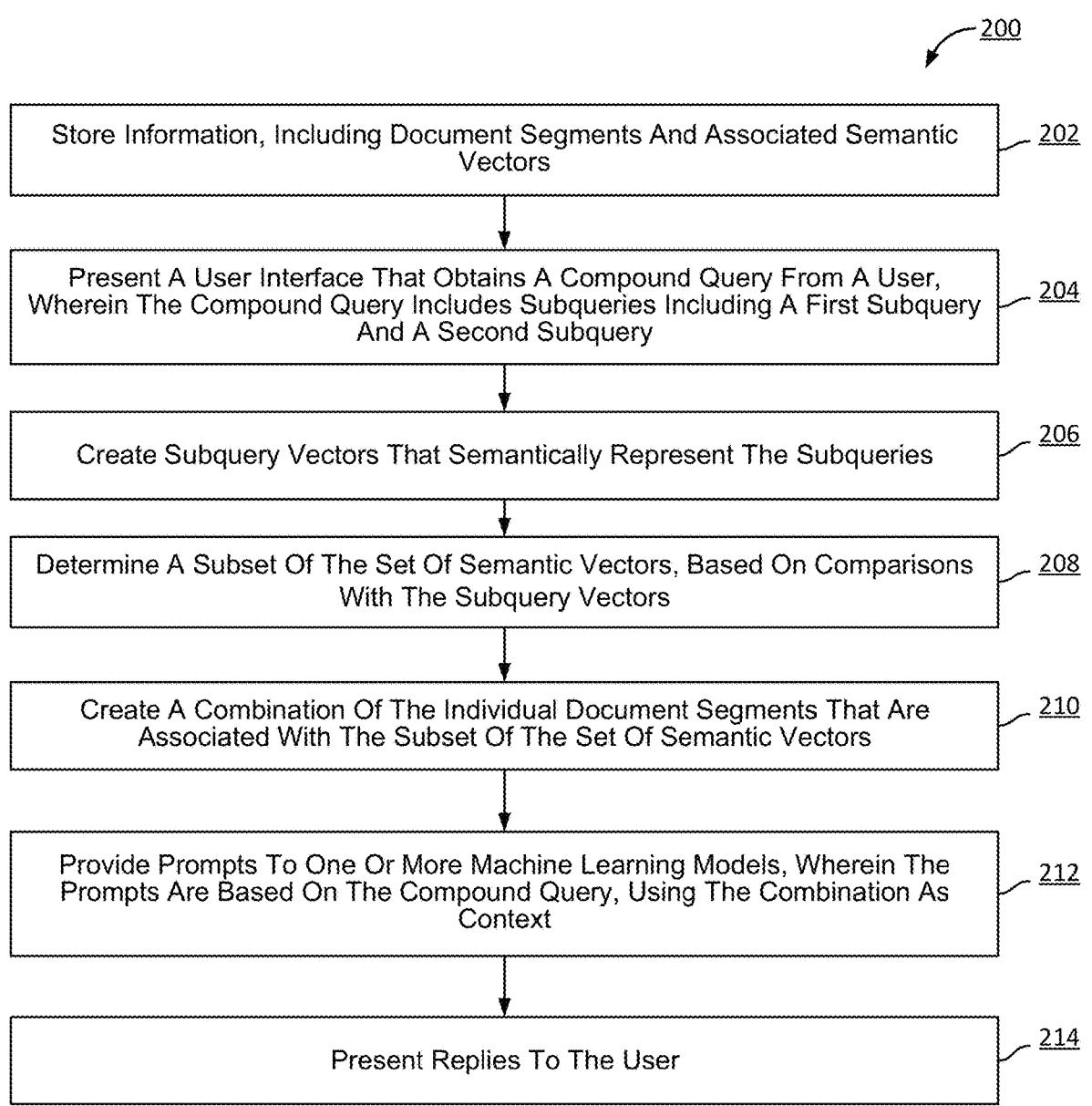

200

Store Information, Including Document Segments And Associated Semantic Vectors — 202

Present A User Interface That Obtains A Compound Query From A User, Wherein The Compound Query Includes Subqueries Including A First Subquery And A Second Subquery — 204

Create Subquery Vectors That Semantically Represent The Subqueries — 206

Determine A Subset Of The Set Of Semantic Vectors, Based On Comparisons With The Subquery Vectors — 208

Create A Combination Of The Individual Document Segments That Are Associated With The Subset Of The Set Of Semantic Vectors — 210

Provide Prompts To One Or More Machine Learning Models, Wherein The Prompts Are Based On The Compound Query, Using The Combination As Context — 212

Present Replies To The User — 214

*Fig. 2*

SYSTEMS AND METHODS FOR USING PROMPT DISSECTION FOR LARGE LANGUAGE MODELS

FIELD OF THE DISCLOSURE

The present disclosure relates to systems and methods for using prompt dissection to prompt one or more machine learning models for extracting information from a set of one or more documents.

BACKGROUND

Extracting information from electronic documents is known. Presenting information in user interfaces is known. Large language models are known.

SUMMARY

One aspect of the present disclosure relates to a system configured to use prompt dissection to prompt one or more machine learning models for a set of one or more documents. In some implementations, the set of one or more documents spans at least 200 pages. The system may include electronic storage, one or more hardware processors configured by (non-transitory) machine-readable instructions, and/or other components. The system may be configured to create and/or store a set of document segments from the set of one or more documents. The system may be configured to create and/or store a set of semantic vectors. Individual semantic vectors may be associated with individual document segments, e.g., such that an individual semantic vector semantically represents an individual document segment. The system may be configured to present a user interface to obtain a compound query that includes a first subquery and a second subquery. The system may be configured to create subquery vectors that semantically represent the subqueries. The system may be configured to determine a subset of a set of semantic vectors based on comparisons with the subquery vectors. The system may be configured to create a combination of the individual document segments that are associated with the subset. The system may be configured to provide one or more prompts to the one or more machine learning models, using the combination of the individual document segments as context. The system may be configured to present replies from the one or more machine learning models. The system may be configured to perform other steps.

Another aspect of the present disclosure relates to a method of using prompt dissection to prompt one or more machine learning models for a set of one or more documents. In some implementations, the set of one or more documents spans at least 200 pages. The method may include creating and/or storing a set of document segments from the set of one or more documents. The method may include creating and/or storing a set of semantic vectors. Individual semantic vectors may be associated with individual document segments, e.g., such that an individual semantic vector semantically represents an individual document segment. The method may include presenting a user interface to obtain a compound query that includes a first subquery and a second subquery. The method may include creating subquery vectors that semantically represent the subqueries. The method may include determining a subset of a set of semantic vectors based on comparisons with the subquery vectors. The method may include creating a combination of the individual document segments that are associated with the subset. The method may include providing one or more prompts to the one or more machine learning models, using the combination of the individual document segments as context. The method may include presenting replies from the one or more machine learning models. The method may include performing other steps.

As used herein, any association (or relation, or reflection, or indication, or correspondency) involving servers, processors, client computing platforms, documents, segments, characters, vectors, tokens, representations, presentations, extracted information, user interfaces, queries, subqueries, prompts, replies, models, comparisons, determinations, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, extract, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 2 illustrates a method of using prompt dissection to prompt one or more machine learning models for a set of one or more documents, in accordance with one or more implementations.

DETAILED DESCRIPTION

Figure 1:
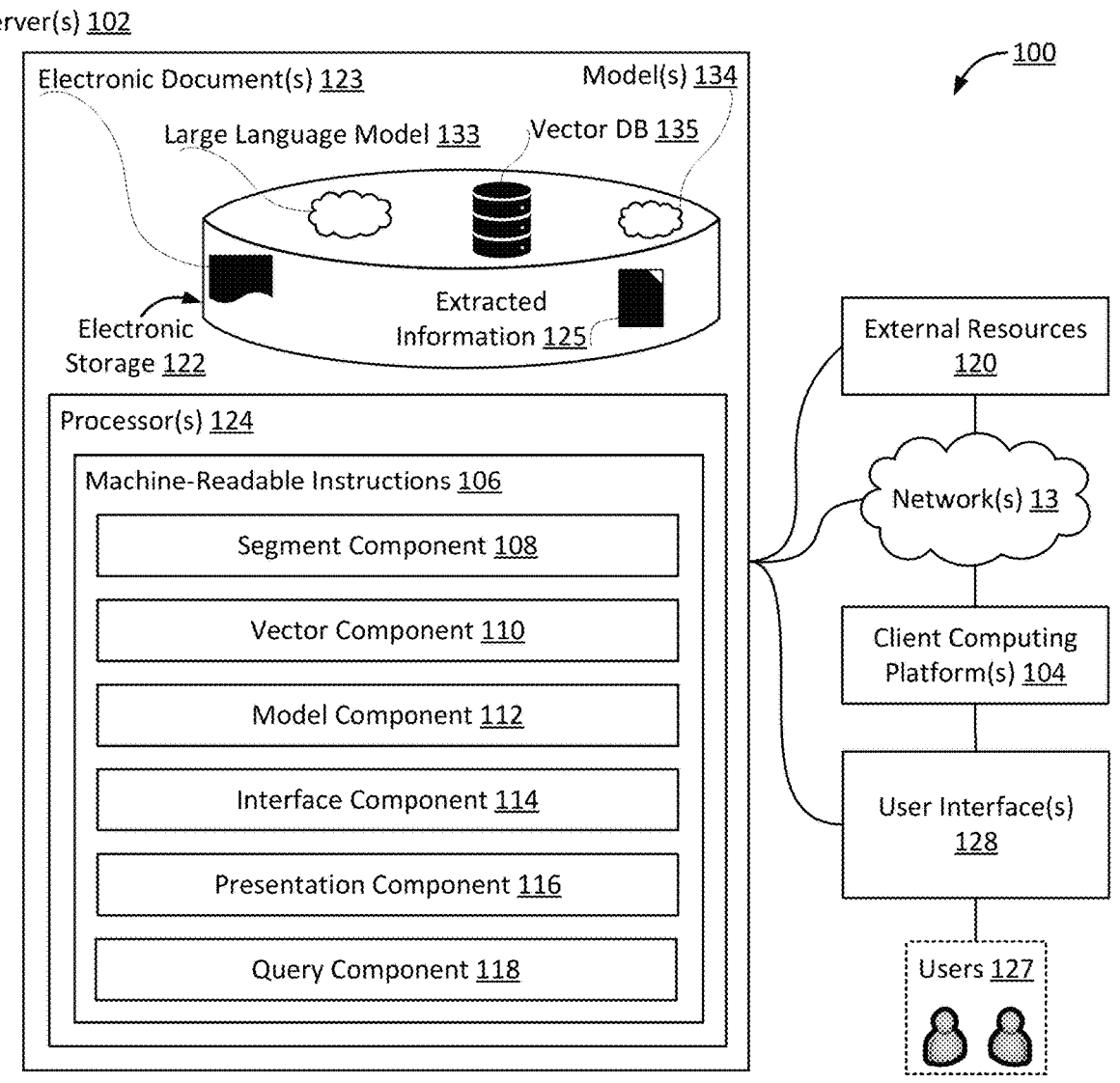
FIG. 1 illustrates a system configured to use prompt dissection to prompt one or more machine learning models for a set of one or more documents, in accordance with one or more implementations.

FIG. 1 illustrates a system 100 configured to use prompt dissection to prompt one or more models 134 (which may include one or more machine learning models) for a set of one or more (electronic) documents 123, in accordance with one or more implementations. In some implementations, system 100 may include one or more servers 102, one or more client computing platforms 104, one or more user interfaces 128, external resources 120, a large language model 133, one or more (machine learning) models 134, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users 127 may access system 100 via client computing platform(s) 104. In some implementations, individual users may be associated with individual client computing platforms 104. For example, a first user may be associated with a first client computing platform 104, a second user may be associated with a second client computing platform 104, and so forth. In some implementations, individual user interfaces 128 may be associated with individual client computing platforms 104. For example, a first user interface 128 may be associated with a first client computing platform 104, a second user interface 128 may be associated with a second client computing platform 104, and so forth.

By virtue of the systems and methods disclosed herein, a user may use one or more models 134 (including, e.g., a machine learning model such as large language model 133) to extract information from a set of electronic documents, even though the set of electronic documents is sufficiently large (e.g., spanning at least 200 pages) that using the entirety of the set as context exceeds the capacity (e.g., in pages, vectors, tokens, and/or another measure of information quantity) of individual ones of model(s) 134 to be used as context. Instead, a subset or portion of the set of documents is used as context. How the extracted information is subsequently used may be outside of the scope of this disclosure. By way of non-limiting example, the systems and methods disclosed herein may be used to process a mortgage application, a loan application, an insurance claim, an application for an identity document, and/or other uses of (automatically) extracting information from documents.

Server(s) 102 may be configured by machine-readable instructions 106. Machine-readable instructions 106 may include one or more instruction components. The instruction components may include computer program components. The instruction components may include one or more of a segment component 108, a vector component 110, a model component 112, an interface component 114, a presentation component 116, a query component 118, and/or other instruction components.

Segment component 108 may be configured to obtain and/or retrieve documents, including but not limited to electronic documents 123, including scanned images, captured photographs, and/or other documents in electronic format. As used herein, the terms "electronic document" and "electronic source document", and derivatives thereof, may be used interchangeably. In some implementations, multiple documents may form a set of documents. For example, the set of documents may be provided as input and/or context for extracting information.

Segment component 108 may be configured to create, determine, and/or store document segments from a page, a document, and/or a set of documents. As used herein, document segments may be referred to as document chunks. For example, a document segment may be a portion or segment of a page, a document, and/or a set of documents. For example, a particular document segment may be one or more paragraphs or sentences of a document. In some cases, a particular document segment may be a caption, a title, a header, and/or a footer of a document. In some cases, a particular document segment may be a partial or entire column, row, list, table, and/or other structured information element contained within a document. Segment component 108 may create a set of document segments from a set of one or more documents. In some cases, the set of one or more documents may span at least 200 pages, at least 300 pages, at least 400 pages, at least 500 pages, at least 1000 pages, and/or another minimum number of pages (or, in some cases, a minimum quantity of information in units other than pages). In some cases, the quantity of information in a set of one or more documents may be defined and/or determined not (merely) by page count, but rather by one or more of a number of segments, a number of tokens, a number of semantic vectors, and/or combinations thereof. In some implementations, the creation of document segments may be based on the type of contents on one or more pages (e.g., prose, natural language, structured information, tables, etc. etc.). In some implementations, segment component 108 may be configured to store sets of document segments, e.g., in electronic storage 122. In some implementations, segment component 108 and/or vector component 110 may be configured to store (semantic) vectors, e.g., in electronic storage 122 and/or vector database 135.

In some implementations, segment component 108 may be configured to create combinations of individual document segments. For example, a particular combination may be used as context for one or more models 134 (e.g., a machine learning model such as large language model 133). In particular, the particular combination may be used as context for one or more prompts provided to one or more (machine learning) models 134. In some cases, the one or more prompts may be based on a (compound) query. In some implementations, a combination of individual document segments may include those document segments that are associated with a particular subset of semantic vectors, in particular, a subset of semantic vectors that has been determined and/or selected by vector component 110 and/or another component of system 100.

In some implementations, segment component 108 may obtain and/or access documents forming a corpus of electronic documents, and/or a set of electronic documents. By way of non-limiting example, the electronic formats of the electronic documents may be one or more of Portable Document Format (PDF), Portable Network Graphics (PNG), Tagged Image File Format (TIF or TIFF), Joint Photographic Experts Group (JPG or JPEG), and/or other formats. Electronic documents may be stored and obtained as electronic files. In some implementations, an electronic document may be a scanned and/or photographed version of an original paper document and/or otherwise physical original document, or a copy of an original digital document. In some implementations, original documents may have been published, generated, produced, communicated, and/or made available by a business entity and/or government agency. Business entities may include corporate entities, non-corporate entities, and/or other entities. For example, an original document may have been communicated to customers, clients, account holders, and/or other interested parties. By way of non-limiting example, a particular original document may have been communicated by a financial institution to an account holder, by an insurance company to a policy holder or affected party, by a department of motor vehicles to a driver, etc. In some implementations, original documents may include financial reports, financial records, and/ or other financial documents.

As used herein, documents may be referred to as "source documents" when the documents are originally published, generated, produced, communicated, and/or made available, or when the documents are copies thereof. Alternatively, and/or simultaneously, documents may be referred to as "source documents" when the documents are a source of human-readable information, or a basis or a container for human-readable information.

In some implementations, one or more electronic formats used for the electronic documents may encode visual information that represents human-readable information. For example, the human-readable information may be positioned on multiple line positions. In some implementations, the visual information may include one or more blocks of content, such as, e.g., a first block of content, a second block of content, and so forth. Blocks of content may represent human-readable information, such as characters, words, dates, amounts, phrases, etc. In a particular case, different blocks of content may be (positioned) on different lines or line positions. For example, the first block of content may be positioned above or below the second block of content. As an example, two characters could be vertically aligned if they are positioned on the same line, so neither is above or below the other. For example, the elements in a row of a table may be vertically aligned, and the elements in a column of a table may be horizontally aligned.

In some implementations, one or more electronic formats used for the electronic documents may be such that, upon presentation of the electronic documents through user interfaces 128, the presentation(s) include human-readable information. By way of non-limiting example, human-readable information may include any combination of numbers, letters, diacritics, symbols, punctuation, and/or other information (jointly referred to herein as "characters"), which may be in any combination of alphabets, syllabaries, and/or logographic systems. In some implementations, characters may be grouped and/or otherwise organized into groups of characters (e.g., any word in this disclosure may be an example of a group of characters, particularly a group of alphanumerical characters). For example, a particular electronic document 123 may include multiple groups of characters, such as, e.g., a first group of characters, a second group of characters, a third group of characters, a fourth group of characters, and so forth. Groups of characters may be included in blocks of content.

The electronic formats may be suitable and/or intended for human readers, and not, for example, a binary format that is not suitable for human readers. For example, the electronic format referred to as "PDF" is suitable and intended for human readers when presented using a particular application (e.g., an application referred to as a "pdf reader"). In some implementations, particular electronic document 123 may represent one or more of a bank statement, a financial record, a photocopy of a physical document from a government agency, and/or other documents. For example, a particular electronic document 123 may include a captured and/or generated image and/or video. For example, a particular electronic document 123 may be a captured and/or generated image. The electronic documents obtained by segment component 108 may have a particular size and/or resolution.

Referring to FIG. 1, presentation component 116 may be configured to generate, effectuate, and/or present user interfaces 128 on client computing platforms 104 to users 127. For example, presentation component 116 may be configured to present a particular user interface 128 on a particular client computing platform 104 to a particular user. In some implementations, particular user interface 128 may be configured to obtain (entry of) user input from a particular user. For example, the user input may be a particular (compound) query from the particular user (e.g., to be provided to one or more models 134, such as large language model 133). Compound queries may include (or be based on) two or more subqueries. By way of non-limiting example, a compound query could be: "What are the salary details of John Doe? Add both the state and federal tax withholdings." Both of these subqueries are positive. Or, restated, "What are the salary details of John Doe, including both the state and federal tax withholdings?". Another example of a compound query is: "What are the salary details of John Doe? Don't pick the results from the summary." Here, the first subquery is positive but the second subquery is negative. Another example of a compound query is "Who are all the employees in the New York office? But only list the employees making more than $75K a year." Here, the first subquery is positive and the second subquery is a constraint for the results/replies to the first subquery. Constraints may act as a limitation, a filter, or be related to formatting, tone, and/or other ways to control, modify, or process the replies from one or more (machine learning) models 134. Constraints may be considered as neither positive nor negative.

In some implementations, particular user input may select one or more documents, including but not limited to a set of exemplary document. In some cases, user input may indicate a folder of training data. In some implementations, the one or more documents may be provided as input or context to extract information, e.g., from a particular corpus of electronic documents. Referring to FIG. 1, in some implementations, presentation component 116 may be configured to present one or more graphical user interface elements on one or more user interfaces 128, e.g., responsive to a selection by a user (e.g., through user input received by interface component 114). In some implementations, presentation component 116 may present particular information in a particular portion of a particular user interface 128.

User interfaces 128 may be configured to enable users 127 to control (e.g., through user input) the extraction of information from one or more documents. Extraction of information may be performed by large language model 133 and/or one or more (machine learning) models 134 (e.g., using a particular document or a part of a document as input and/or context). In some implementations, the extraction of information may be user-directed, i.e., controlled by an individual one of users 127 through user input.

Referring to FIG. 1, model component 112 may be configured to obtain, access, use, and/or fine-tune one or more (machine learning) models 134, e.g., such as large language model 133. In some implementations, large language model 133 may have been trained on at least a million documents. In some implementations, large language model 133 may have been trained on at least 100 million documents. In some implementations, large language model 133 may include and/or be based on a neural network using over a billion parameters and/or weights. In some implementations, large language model 133 may include and/or be based on a neural network using over a 100 billion parameters and/or weights. In some implementations, large language model 133 may be based on Generative Pre-trained Transformer 3 (GPT3). In some implementations, large language model 133 may be based on ChatGPT, as developed by OpenAI™. In some implementations, large language model 133 may be derived from Generative Pre-trained Transformer 3 (GPT3) or a successor of Generative Pre-trained Transformer 3 (GPT3).

In some implementations, model component 112 may be configured to create and/or otherwise determine vectors, arrays, and/or other mathematical representations of information, including but not limited to user input, queries, subqueries, document segments, words, tokens, and/or other types of information. For example, model component 112 may create one or more semantic vectors that are associated with one or more document segments. Semantic vectors may represent semantic information. As used herein, vectors may represent what text means by a set of numbers, sometimes referred to as text embeddings. Such vectors may have hundreds or thousands of dimensions, and the values for these dimensions may be stored and/or organized in an array of floating point numbers. For example, model component 112 may create and/or otherwise determine a (sub)query vector that semantically represents a particular (sub)query. In some implementations, model component 112 may use one or more (machine learning) models 134, such as large language model 133, to determine and/or create semantic vectors. For example, assume a particular query includes a first subquery and a second subquery. Model component 112 may create a first subquery vector representing the first subquery and a second subquery vector representing the second subquery.

In some implementations, model component 112 may be configured to fine-tune large language model 133 through a set of documents (e.g., training documents). In some cases, the training documents may include financial documents, including but not limited to bank statements, insurance documents, mortgage documents, loan documents, and/or other financial documents. Large language model 133 may be able to determine and/or use whether information is formatted in a column, or a row, or a table. Accordingly, information elements in a column, or a row, or a table may be contextually and/or semantically linked and/or otherwise connected such that large language model 133 may extract information from a particular document based on knowledge of the formatted information in the particular document. In some implementations, model component 112 and/or presentation component 116 may be configured to obtain and/or present replies provided by large language model 133 to queries and/or prompts.

Referring to FIG. 1, interface component 114 may be configured to provide documents (or parts of documents) to one or more models 134 (e.g., to large language model 133) as input and/or context. For example, interface component 114 may provide one or more particular documents to large language model 133 as input and/or context for queries and/or other types of extraction of information. In some implementations, interface component 114 may be configured to provide sets or subsets of document segments to large language model 133 as input and/or context, such as, for example, a particular combination of individual document segments as created by segment component 108 and determined/selected by vector component 110. In some implementations, interface component 114 provides (input and/or context) documents to large language model 133 for extraction of information, including but not limited to user-directed extraction of information. In some implementations, interface component 114 may be configured to provide queries as prompts to large language model 133. In some implementations, interface component 114 may be configured to obtain replies to queries from large language model 133. In some implementations, interface component 114 may provide input and/or prompts to large language model 133 after or subsequent to fine-tuning of large language model 133 by model component 112.

Referring to FIG. 1, vector component 110 may be configured to determine and/or select a subset of a set of semantic vectors, such as, by way of non-limiting example, the particular set of semantic vectors that has been determined and/or created by model component 112 and/or one or more (machine learning) models 134 and/or large language model 133. In some implementations, determinations by vector component 110 may be based on one or more types of comparisons. For example, in case of a compound query comprising a first and second subquery represented by a first and second subquery vector, respectively, individual semantic vectors may be compared with both the first and second subquery vectors. Different types of comparisons may be used for different types of subqueries. In some implementations, the subset of semantic vectors and/or the corresponding document segments may be limited in size or number such that a quantity of information represented by the subset is within the capacity of one or more particular machine learning models, such as, e.g., large language model 133, to be used as context for prompts.

In some cases, comparisons may be based on one or both of semantic distance and/or (cosine) similarity. For example, different words having similar meanings may have a smaller semantic distance (or more similarity) than unrelated words. For example, "fruit" and "juice" may have a smaller semantic distance than "tricycle" and "goldfish". Some types of comparisons may use keyword matching and/or keyword searching, in which two words need to match verbatim and/or to the letter. By way of non-limiting example, measuring similarity between vectors may include calculating inner product, cosine similarity, Euclidean distance, Jaccard similarity, Manhattan similarity, and/or another similarity metric.

In some implementations, another type of comparison used for determinations by vector component 110 may be based on absolute positioning of a corresponding document segment within a particular set of documents. For example, the first page of a particular set of documents may be an important absolute position for determinations by vector component 110. Likewise, in some cases, the last page of a particular set of documents may be an important absolute position for determinations by vector component 110.

In some implementations, another type of comparison used for determinations by vector component 110 may be based on relative positioning of a corresponding document segment within a particular set of documents. For example, a document segment adjacent to another document segment that was previously selected (e.g., based on another type of comparison) may be an important document segment for determinations by vector component 110.

Query component 118 may be configured to split a compound query into multiple subqueries. In some implementations, query component 118 may be configured to determine two or more subqueries based on a particular compound query. In some implementations, query component 118 may determine how to combine subqueries (e.g., sequentially and/or logically) to be similar in scope as the corresponding compound query. In some implementations, query component 118 may be configured to determine and/or otherwise classify whether a (sub)query is a positive query, a negative query, or a constraint (for other results and/or replies, e.g., for a subquery). In some implementations, individual subqueries may be provided as prompts to one or more (machine learning) models 134 individually. For example, the reply to a first prompt may be used as input and/or context for a second prompt, and so forth, in a pipeline. In other implementations, multiple subqueries may be provided as a (compound) prompt to one or more (machine learning) models 134 in a single step or at the same time. Combinations of positive and negative subqueries are considered within the scope of this disclosure. Additionally, combinations of one or more positive subqueries, one or more negative subqueries, and one or more constraints are considered within the scope of this disclosure.

Vector component 110 may be configured to store vectors and/or other information in vector database 135 and/or other storage, including but not limited to electronic storage 122. For example, vector component 110 may store semantic vectors (e.g., as determined by model component 112 and/or one or more (machine learning) models 134 and/or large language model 133) in vector database 135.

Figure 3A:
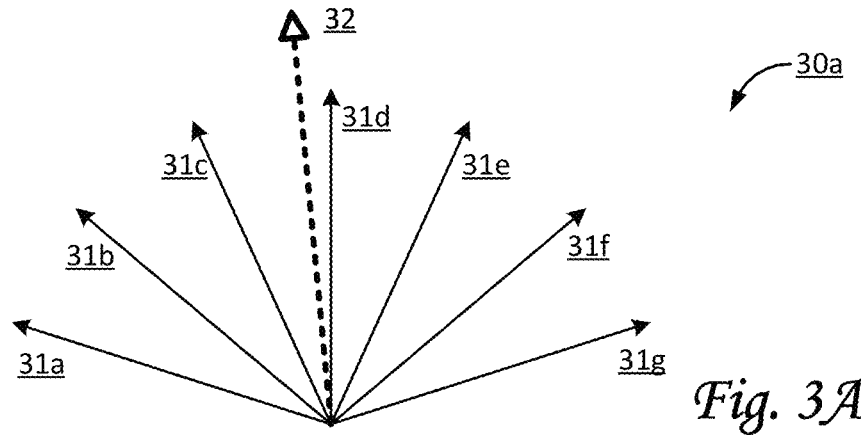
FIG. 3A illustrates an exemplary depiction of determining a subset of semantic vectors as may be used in a system configured to use prompt dissection to prompt one or more machine learning models for a set of one or more documents, in accordance with one or more implementations.

By way of non-limiting example, FIG. 3A illustrates a depiction 30*a* of a set of semantic vectors that are associated with a corresponding set of document segments (not depicted) for a particular document (not depicted). Assume the set of semantic vectors includes vectors 31*a*, 31*b*, 31*c*, 31*d*, 31*e*, 31*f*, and 31*g*. Assume a particular query or subquery is represented semantically by a query vector 32 as depicted in FIG. 3A. Assume the target size for determining and/or selecting a subset of these semantic vectors is three vectors. A component similar to or the same as vector component 110 (not depicted in FIG. 3A) may determine that vectors 31*c*, 31*d*, and 31*e* have the greatest similarity to query vector 32 (e.g., by having the smallest semantic distance, the greatest cosine similarity, etc.). A combination of the individual document segments associated with vectors 31*c*, 31*d*, and 31*e* may subsequently be used as context for one or more prompts based on the particular query or subquery represented semantically by query vector 32.

Figure 3B:
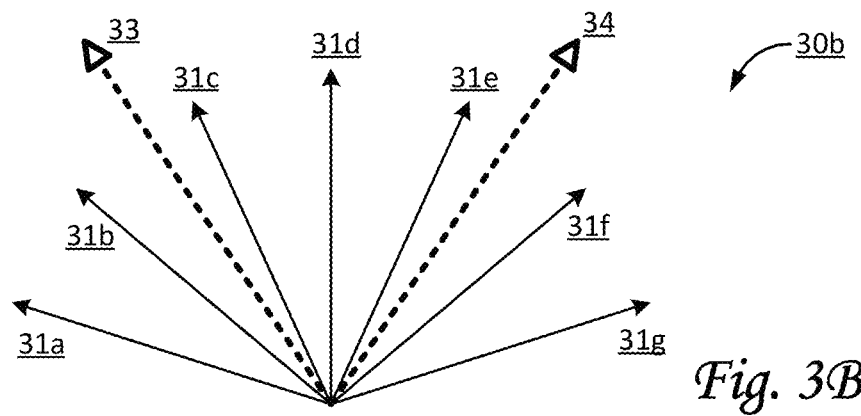
FIG. 3B illustrates an exemplary depiction of determining a subset of semantic vectors as may be used in a system configured to use prompt dissection to prompt one or more machine learning models for a set of one or more documents, in accordance with one or more implementations.

By way of non-limiting example, FIG. 3B illustrates a depiction 30*b* of a set of semantic vectors that are associated with a corresponding set of document segments (not depicted) for a particular document (not depicted). Assume the set of semantic vectors includes vectors 31*a*, 31*b*, 31*c*, 31*d*, 31*e*, 31*f*, and 31*g*. Assume a first particular subquery is represented semantically by a subquery vector 33 and a second particular subquery is represented semantically by a subquery vector 34 as depicted in FIG. 3B. For example, the first particular subquery and the second particular subquery may both be part of a particular compound query. Assume that both subqueries are positive, and the target size for determining and/or selecting a subset of these semantic vectors is three vectors. A component similar to or the same as vector component 110 (not depicted in FIG. 3B) may determine that vectors 31*c*, 31*d*, and 31*e* have the greatest similarity to both subquery vector 33 and subquery vector 34 at the same time (e.g., by having the smallest (aggregated) semantic distance, the greatest (aggregated) cosine similarity, etc.). If subquery vector 33 were used in isolation for a determination of subvectors (and corresponding document segments), vector 31*b* might have been selected (and vector 31*d* might not have been selected). Similarly, if subquery vector 34 were used in isolation for a determination of subvectors (and corresponding document segments), vector 31*f* might have been selected (and vector 31*d* might not have been selected). However, the actual determination and/or selection of the subset of vectors described for this example uses two targets simultaneously. In some cases, the selected subset of vectors 31*c*, 31*d*, and 31*e* may exclude vectors that would have been selected for an individual subquery vector in isolation. In some cases, the selected subset of vectors 31*c*, 31*d*, and 31*e* may include vectors that would not have been selected for any of the individual subquery vectors in isolation. Subsequently to the selection of this subset of vectors, a combination of the individual document segments associated with vectors 31*c*, 31*d*, and 31*e* may be used as context for the one or more prompts based on the particular compound query that includes the first particular subquery and the second particular subquery. Compound queries with more than two subqueries are envisioned within the scope of this disclosure.

Figure 3C:
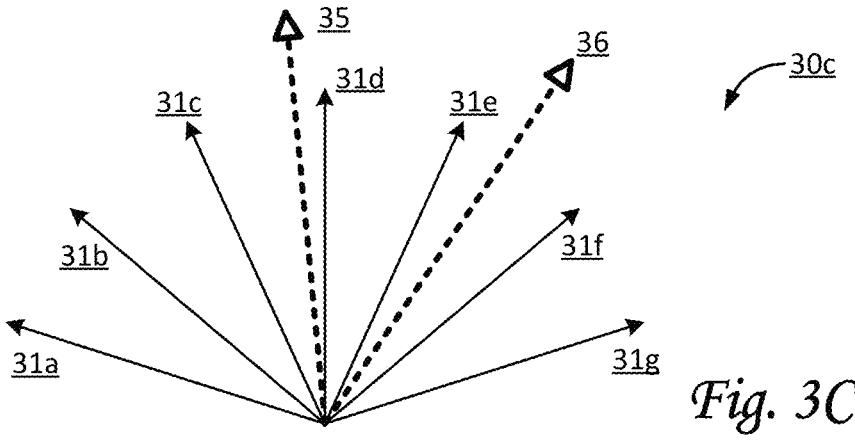
FIG. 3C illustrates an exemplary depiction of determining a subset of semantic vectors as may be used in a system configured to use prompt dissection to prompt one or more machine learning models for a set of one or more documents, in accordance with one or more implementations.

By way of non-limiting example, FIG. 3C illustrates a depiction 30*c* of a set of semantic vectors that are associated with a corresponding set of document segments (not depicted) for a particular document (not depicted). Assume the set of semantic vectors includes vectors 31*a*, 31*b*, 31*c*, 31*d*, 31*e*, 31*f*, and 31*g*. Assume a first particular subquery is represented semantically by a subquery vector 35 and a second particular subquery is represented semantically by a subquery vector 36 as depicted in FIG. 3C. For example, the first particular subquery and the second particular subquery may both be part of a particular compound query. Assume that the first subquery is positive and the second subquery is negative (in some cases, a negative subquery may be logically inverted prior to determining its subquery vector), and the target size for determining and/or selecting a subset of these semantic vectors is three vectors. A component similar to or the same as vector component 110 (not depicted in FIG. 3C) may determine that vectors 31*b*, 31*c*, and 31*d* have the greatest similarity to subquery vector 35 while also at the same time having the greatest dissimilarity to subquery vector 36. In particular, vector 31*e* might have been selected if subquery vector 35 were considered in isolation, but needs to be excluded due to its comparison with subquery vector 36 (since the second subquery is negative). A combination of the individual document segments associated with vectors 31*b*, 31*c*, and 31*d* may subsequently be used as context for the one or more prompts based on the particular compound query that includes the first particular subquery and the second particular subquery.

Referring to FIG. 1, as used herein, the term "extract" and its variants refer to the process of identifying and/or interpreting information that is included in one or more documents, whether performed by determining, measuring, calculating, computing, estimating, approximating, interpreting, generating, and/or otherwise deriving the information, and/or any combination thereof. In some implementations, extracted information may have a semantic meaning, including but not limited to opinions, judgement, classification, and/or other meaning that may be attributed to (human and/or machine-powered) interpretation. For example, in some implementations, some types of extracted information need not literally be included in a particular electronic source document, but may be a conclusion, classification, and/or other type of result of (human and/or machine-powered) interpretation of the contents of the particular electronic source document. In some implementations, the extracted information may have been extracted by one or more extraction engines. For example, a particular extraction engine (referred to as an Optical Character Recognition engine or OCR engine) may use a document analysis process that includes optical character recognition (OCR). For example, a different extraction engine (referred to as a line engine) may use a different document analysis process that includes line detection. For example, another extraction engine (referred to as a barcode engine) may use a document analysis process that includes detection of barcodes, Quick Response (QR) codes, matrices, and/or other machine-readable optical labels. Alternatively, and/or simultaneously, in some implementations, the extracted information may have been extracted by a document analysis process that uses machine-learning (in particular deep learning) techniques. For example, (deep learning-based) computer vision technology may have been used. For example, a convolutional neural network may have been trained and used to classify (pixelated) image data as characters, photographs, diagrams, media content, and/or other types of information. In some implementations, the extracted information may have been extracted by a document analysis process that uses a pipeline of steps for object detection, object recognition, and/or object classification. In some implementations, the extracted information may have been extracted by a document analysis process that uses one or more of rule-based systems, regular expressions, deterministic extraction methods, stochastic extraction methods, and/or other techniques. In some implementations, particular document analysis processes that were used to extract the extracted information may fall outside of the scope of this disclosure, and the results of these particular document analysis processes, e.g., the extracted information, may be obtained and/or retrieved by a component of system 100.

In some implementations, server(s) 102, client computing platform(s) 104, and/or external resources 120 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured to execute computer program components. The computer program components may be configured to enable an expert or user associated with the given client computing platform 104 to interface with system 100 and/or external resources 120, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

User interfaces 128 may be configured to facilitate interaction between users 127 and system 100 and/or between users 127 and client computing platforms 104. For example, user interfaces 128 may provide an interface through which users may provide information to and/or receive information from system 100. In some implementations, user interface 128 may include one or more of a display screen, touchscreen, monitor, a keyboard, buttons, switches, knobs, levers, mouse, microphones, sensors to capture voice commands, sensors to capture eye movement and/or body movement, sensors to capture hand and/or finger gestures, and/or other user interface devices configured to receive and/or convey user input. In some implementations, one or more user interfaces 128 may be included in one or more client computing platforms 104. In some implementations, one or more user interfaces 128 may be included in system 100.

External resources 120 may include sources of information outside of system 100, external entities participating with system 100, and/or other resources. In some implementations, external resources 120 may include a provider of documents, including but not limited to electronic documents 123, from which system 100 and/or its components (e.g., segment component 108) may obtain documents. In some implementations, external resources 120 may include a provider of information and/or models, including but not limited to extracted information 125, one or more models 134, and/or other information from or through which system 100 and/or its components may obtain information, input, and/or context. In some implementations, some or all of the functionality attributed herein to external resources 120 may be provided by resources included in system 100.

Server(s) 102 may include electronic storage 122, one or more processors 124, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102. In some implementations, some or all of the functionality attributed herein to server 102 and/or system 100 may be provided by resources included in one or more client computing platform(s) 104.

Electronic storage 122 may comprise non-transitory storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. Processor (s) 124 may be configured to execute components 108, 110, 112, 114, 116, and/or 118, and/or other components. Processor(s) 124 may be configured to execute components 108, 110, 112, 114, 116, and/or 118, and/or other components by software; hardware; firmware; some combination of software, hardware, and/or firmware; and/or other mechanisms for configuring processing capabilities on processor (s) 124. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, and/or 118 are illustrated in FIG. 1 as being implemented within a single processing unit, in implementations in which processor(s) 124 includes multiple processing units, one or more of components 108, 110, 112, 114, 116, and/or 118 may be implemented remotely from the other components. The description of the functionality provided by the different components 108, 110, 112, 114, 116, and/or 118 described below is for illustrative purposes, and is not intended to be limiting, as any of components 108, 110, 112, 114, 116, and/or 118 may provide more or less functionality than is described. For example, one or more of components 108, 110, 112, 114, 116, and/or 118 may be eliminated, and some or all of its functionality may be provided by other ones of components 108, 110, 112, 114, 116, and/or 118. As another example, processor(s) 124 may be configured to execute one or more additional components that may perform some or all of the functionality attributed below to one of components 108, 110, 112, 114, 116, and/or 118.

FIG. 2 illustrates a method 200 of using prompt dissection to prompt one or more machine learning models for a set of one or more documents, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to (non-transitory) instructions stored electronically on an electronic storage medium. The one or more processing devices may include one or more devices configured through hardware, firmware, and/or software to be specifically designed for execution of one or more of the operations of method 200.

At an operation 202, information is electronically stored. The stored information includes a set of document segments. Individual document segments are included in the set of one or more documents. The stored information further includes a set of semantic vectors. Individual semantic vectors are associated with individual document segments. In some embodiments, operation 202 is performed by a segment component and/or a vector component the same as or similar to segment component 108 and/or vector component 112 (shown in FIG. 1 and described herein).

At an operation 204, a presentation of a user interface is effectuated that obtains a compound query from a user. The compound query includes two or more subqueries including a first subquery and a second subquery. In some embodiments, operation 204 is performed by a presentation component the same as or similar to presentation component 116 (shown in FIG. 1 and described herein).

At an operation 206, subquery vectors are created, using the one or more machine learning models, for individual ones of the two or more subqueries. The subquery vectors semantically represent the two or more subqueries. The subquery vectors include a first subquery vector representing the first subquery and a second subquery vector representing the second subquery. In some embodiments, operation 206 is performed by a model component the same as or similar to model component 112 (shown in FIG. 1 and described herein).

At an operation 208, a subset of the set of semantic vectors is determined. The determination is based on one or more types of comparisons with the first subquery vector and the second subquery vector. In some embodiments, operation 208 is performed by a vector component the same as or similar to vector component 110 (shown in FIG. 1 and described herein).

At an operation 210, a combination is created of the individual document segments that are associated with the subset of the set of semantic vectors as determined. In some embodiments, operation 210 is performed by a segment component the same as or similar to segment component 108 (shown in FIG. 1 and described herein).

At an operation 212, one or more prompts are provided to the one or more machine learning models, using the created combination of the individual document segments as context. The one or more prompts are based on the compound query. In some embodiments, operation 212 is performed by an interface component the same as or similar to interface component 114 (shown in FIG. 1 and described herein).

At an operation 214, one or more replies are presented to the user, through the user interface. The one or more replies are obtained from the one or more machine learning models in reply to the one or more prompts. In some embodiments, operation 214 is performed by a presentation component the same as or similar to presentation component 116 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to use prompt dissection to prompt one or more machine learning models for a set of one or more documents, the system comprising:

electronic storage configured to electronically store information, wherein the stored information includes a set of document segments, wherein individual document segments are included in the set of one or more documents, wherein the stored information further includes a set of semantic vectors, wherein individual semantic vectors are associated with individual document segments; and one or more hardware processors configured by machine-readable instructions to:

effectuate a presentation of a user interface, the user interface being configured to obtain a compound query from a user, wherein the compound query includes two or more subqueries including a first subquery and a second subquery;

create, using the one or more machine learning models, a first subquery vector representing the first subquery;

determine a subset of the set of semantic vectors, wherein the determination is based on comparisons, wherein the comparisons include a first comparison using the first subquery vector;

create a combination of the individual document segments that are associated with the subset of the set of semantic vectors as determined;

provide one or more prompts to the one or more machine learning models that prompt the one or more machine learning models to generate one or more replies, using the created combination of the individual document segments as context for the one or more machine learning models, wherein the one or more prompts are based on the compound query, wherein the second subquery constrains the one or more replies, wherein an individual machine learning model from the one or more machine learning models is limited to a predetermined numbers of tokens as the context for the one or more prompts, and wherein the combination of the individual document segments is created such that the predetermined number of tokens is not exceeded; and present to the user, through the user interface, the one or more replies obtained from the one or more machine learning models in reply to the one or more prompts, wherein the one or more replies have been constrained by the second subquery.

2. The system of claim 1, wherein the first comparison compares similarity between the first subquery vector and individual ones of the set of semantic vectors.

3. The system of claim 1, wherein the first comparison compares dissimilarity between the first subquery vector and individual ones of the set of semantic vectors.

4. The system of claim 1, wherein the second subquery is a limitation for the one or more replies.

5. The system of claim 1, wherein the second subquery is a filter that constrains the one or more replies.

6. The system of claim 1, wherein the second subquery is related to formatting of the one or more replies.

7. The system of claim 1, wherein the second subquery is related to modifying the one or more replies prior to presentation to the user.

8. The system of claim 1, wherein the individual machine learning model is a large language model.

9. The system of claim 8, wherein the large language model is based on or derived from Generative Pre-trained Transformer 3 (GPT3) or a successor of Generative Pre-trained Transformer 3 (GPT3).

10. A method of using prompt dissection to prompt one or more machine learning models for a set of one or more documents, the method comprising:

electronically storing information, wherein the stored information includes a set of document segments, wherein individual document segments are included in the set of one or more documents, wherein the stored information further includes a set of semantic vectors, wherein individual semantic vectors are associated with individual document segments; and effectuating a presentation of a user interface that obtains a compound query from a user, wherein the compound query includes two or more subqueries including a first subquery and a second subquery;

creating, using the one or more machine learning models, a first subquery vector representing the first subquery;

determining a subset of the set of semantic vectors, wherein the determination is based on comparisons, wherein the comparisons include a first comparison using the first subquery vector;

creating a combination of the individual document segments that are associated with the subset of the set of semantic vectors as determined;

providing one or more prompts to the one or more machine learning models that prompt the one or more machine learning models to generate one or more replies, using the created combination of the individual document segments as context for the one or more machine learning models, wherein the one or more prompts are based on the compound query, wherein the second subquery constrains the one or more replies, wherein an individual machine learning model from the one or more machine learning models is limited to a predetermined numbers of tokens as the context for the one or more prompts, and wherein the combination of the individual document segments is created such that the predetermined number of tokens is not exceeded; and presenting to the user, through the user interface, the one or more replies obtained from the one or more machine learning models in reply to the one or more prompts, wherein the one or more replies have been constrained by the second subquery.

11. The method of claim 10, wherein the first comparison compares similarity between the first subquery vector and individual ones of the set of semantic vectors.

12. The method of claim 10, wherein the first comparison compares dissimilarity between the first subquery vector and individual ones of the set of semantic vectors.

13. The method of claim 10, wherein the second subquery is a limitation for the one or more replies.

14. The method of claim 10, wherein the second subquery is a filter that constrains the one or more replies.

15. The method of claim 10, wherein the second subquery is related to formatting of the one or more replies.

16. The method of claim 10, wherein the second subquery is related to modifying the one or more replies prior to presentation to the user.

17. The method of claim 10, wherein the individual machine learning model is a large language model.

18. The method of claim 17, wherein the large language model is based on or derived from Generative Pre-trained Transformer 3 (GPT3) or a successor of Generative Pre-trained Transformer 3 (GPT3).

* * * * *